Patented Feb. 15, 1949

2,461,761

UNITED STATES PATENT OFFICE 2,461,761

METHOD OF MAKING CELLULAR RESIN MATERIAL

Louis E. Nye, Elkhart, Ind., assignor to United States Rubber Company, New York, N. Y., a corporation of New Jersey No Drawing. Application February 2, 1945, Serial No. 575,925

6 Claims. (Cl. 260—45.4)

This invention relates to a method of making a cellular or expanded resin material, that is formed from a whipped up or expanded 100 per cent polymerizable thermosetting resin.

There are now available two distinct types of polymerizable thermosetting resins marketed in liquid or semi-liquid form. The first type includes such synthetic resins as urea and phenol formaldehyde which when polymerized, or when they undergo a condensation reaction, produce a by-product such as water; these resins can be about 90 per cent polymerized, are soluble in alcohol or some organic solvent and always throw off some by-product upon completion of the polymerization reaction. The second type of synthetic resins can be substantially 100 per cent polymerized and contains no volatile non-polymerizable solvent. The present invention is concerned with this second type of resins.

The earlier efforts made by me to produce a cellular or expanded material from this second type of resins by expanding the liquid or semi-liquid resin and then setting it to a cellular hardened condition, were not successful because after the resin material is whipped up or expanded into a foamy mass it has to be heat-cured to polymerize or harden the resin, and the foamy mass would fall or settle to a compact solid under the action of the heat.

As a result of these unsuccessful early efforts to produce a cellular resin material from this type of resins it became apparent that the foamy mass would have to be made more stable so that it would retain its cellular condition during the curing or setting period.

I have found that if a chemical blowing agent and a small amount of zinc stearate, or other metal stearate, such as lead, sodium, calcium or barium stearate, are added to a resinous mix of the above mentioned 100 per cent polymerizable type of resin, and the mixture is then whipped to form a foamy mass, the metal stearate acts as a foam stabilizer and causes the foamy mass to remain expanded while it is being heat-cured to a cellular hard mass.

The present invention relates to a method of making a rigid cellular material from thermosetting resins of the above mentioned class of 100 per cent polymerizable resins and more particularly to a method of stabilizing the foamed resin so that it will not fall during the curing period. These resins are formed of liquid or semi-liquid polymerizable components which polymerize, together, or interpolymerize in what is known as the oil phase, without splitting off by-products, e. g., water, to form, eventually hard resins.

This class of resins may be further described as those resins produced by the interpolymerization of unsaturated alkyd resins with monoenic compounds having a single terminal ethylenic group $CH_2=C<$. To this class of resins belong the resins represented by the polyethylene glycol-maleate-styrene copolymer resins covered by the Ellis U. S. Patents Nos. 2,255,313 and 2,195,362 and the American Cyanamid Co. British Patents 540,167 and 540,168. As shown in the Ellis Patent No. 2,255,313, these resins may be formed by reacting an ethylene-alpha-beta dicarboxylic acid with a glycol, in such proportions that there are present in the reacting mixture about one carboxyl group in such unsaturated acid to one hydroxyl group in such glycol, to an advanced stage of esterification but short of becoming completely insoluble and infusible, until a product of low acid number is produced which is soluble in a liquid monomeric unsaturated polymerizable compound containing an ethylenic linkage, incorporating the product of such esterification with a liquid monomeric unsaturated polymerizable compound containing an ethylenic linkage, and thereafter subjecting said solution to conjoint polymerization. These resins harden to form tough, non-cracking surfaces.

A good practical composition for making a hard cellular resin, such as contemplated by the present invention, from a liquid or semi-liquid resin of the type above described is produced by the following formula:

|  | Grams |
|---|---|
| Resin (100% polymerizable such as described above) | 100 |
| Benzoyl peroxide (catalyzer) | 1 |
| Tertiary butyl hydroperoxide (catalyzer booster) | 1 |
| Blowing agent[1] (foaming agent) | 20–30 |
| Acetic acid (foaming agent activator) | 1–5 |
| Phenyl hydrazine (gelling agent) | .05–0.2 |

[1] Blowing agent comprising zinc stearate, sodium bicarbonate and water in the proportions of one to two to six by weight.

The ingredients are listed in the order in which they should be added to the mix. The resin is catalyzed by the addition of the benzoyl peroxide and is aerated with a high speed mixer. The zinc stearate, sodium bicarbonate and water are mixed together and then added to the aerated resin and whipped therewith until dispersion is complete and a light foamy mass is formed. Any of the stearates above mentioned may be used but zinc stearate is preferred.

Phenyl hydrazine acts as a gelling agent for the foam and is usually added with the acetic acid just before casting. The foam will begin to gel within two or three minutes after the phenyl hydrazine has been added, and will be completely gelled within five or six minutes. This is controlled by the amount of phenyl hydrazine added, and if it is found that the foam is gelling too fast, the amount of gelling agent may be cut down.

Tertiary butyl hydroperoxide is not essential to make the resin polymerize, but it speeds up the polymerization process so that the time of cure may be reduced slightly. The acetic acid likewise is not necessary, but it contributes to the blowing by reacting with the sodium bicarbonate to form carbon dioxide gas. Other blowing agents than sodium bicarbonate may be used provided they are compatible with the resin mix. The zinc stearate acts as a foam stabilizer, probably by increasing the strength of the foam structure.

After the phenyl hydrazine is added the foamy resinous mass is poured into a mold to fill the same and a cover is applied whereupon it is ready for curing, or this foamy resinous mass may be deposited on a continuously moving belt and gelled thereupon.

The curing of the mix of the above formula may be carried out at a temperature of 230° to 260° F. for from thirty minutes to one hour. The variable here is due to changes in the recipe. When the belt method is used the foam material gels on the traveling belt and is partly dried thereupon by passing through a hot air oven or high frequency alternating current field. It is then placed in an oven at about 250° F. for 30 to 45 minutes for final cure.

The specific gravity of the cellular or expanded material of the present invention may be varied by varying the amount of air whipped with the resin and also by varying the amount of blowing agent used. Using a 100 per cent polymerizable resin such as is described above a cellular mass has been produced that weighed as little as three or four pounds per cubic foot. Tests show that it is possible by practicing the present method to produce cellular material having a specific gravity of .06 to .07, and sufficient hardness and rigidity to support a load of about 100 pounds per square inch. As the specific gravity increases to about .175 the material is capable of supporting 200 pounds per square inch. Urea or phenol formaldehyde foam is only about one-third to one-half as strong as this.

The present cellular resin material has excellent resistance to water. It also has good dielectric properties, and can be used in radar housings and similar fields. The material also has excellent resistance to all types of organic solvents; including alcohols, esters, chlorinated hydrocarbons, ethers, gasoline, aromatic hydrocarbons and etc. Furthermore it burns slowly.

The physical and chemical properties of this rigid cellular material make it well adapted for use as wing liners in airplanes, as a spacer in a sandwich construction for radar equipment, in aircraft construction in which it is sandwiched between structural sheets of aluminum, plywood or the like to give high strength and resistance to bending with a minimum of weight. It is also well adapted for use as a sound deadener and thermal insulator.

This material can be easily cut and sawed into any desired shape, and since it is produced by a combined whipping and chemical blowing action a great number of the cells will be spherical in shape which is a good construction for strength and heat insulating properties.

Having thus described my invention, what I claim and desire to protect by Letters Patent is:

1. The method of making a rigid cellular resin material which comprises forming a mixture of a copolymerizable mix of a monoenic compound having a single terminal ethylenic group $CH_2=C<$ with an unsaturated alkyd resin which is the reaction product of an ethylenic-alpha-beta dicarboxylic acid with a glycol, a polymerization catalyst, a chemical blowing agent, and a metal stearate as a foam stabilizer, whipping the mixture to form a foamy mass, and then heat-curing said foamy mass to a cellular hardened condition.

2. The method of making a rigid cellular resin material which comprises forming a mixture of a copolymerizable mix of a monoenic compound having a single terminal ethylenic group $CH_2=C<$ with an unsaturated alkyd resin which is the reaction product of an ethylenic-alpha-beta dicarboxylic acid with a glycol, a polymerization catalyst, a chemical blowing agent, and zinc stearate as a foam stabilizer, whipping the mixture to form a foamy mass, and then heat-curing said foamy mass to a cellular hardened condition.

3. The method of making a rigid cellular resin material which comprises forming a mixture of a copolymerizable mix of a monoenic compound having a single terminal ethylenic group $CH_2=C<$ with an unsaturated alkyd resin which is the reaction product of an ethylenic-alpha-beta dicarboxylic acid with a glycol, a polymerization catalyst, a chemical blowing agent, and a metal stearate as a foam stabilizer, whipping the mixture to form a foamy mass, adding phenyl hydrazine to said foamy mass, and then heat-curing said mass to a cellular hardened condition.

4. The method of making a rigid cellular resin material which comprises commingling a copolymerizable mix of a monoenic compound having a single terminal ethylenic group $CH_2=C<$ with an unsaturated alkyd resin which is the reaction product of an ethylenic-alpha-beta dicarboxylic acid with a glycol, with benzoyl peroxide as a polymerization catalyst, admixing a mixture of zinc stearate, sodium bicarbonate and water with the resulting mixture, whipping the resulting mixture to a foamy mass, adding phenyl hydrazine and acetic acid to the resulting foamy mass, and then heat-curing said mass to a cellular hardened condition.

5. The method of making a rigid cellular resin material which comprises forming a mixture of a copolymerizable mix of a polyethylene glycol maleate and styrene, a polymerization catalyst, a chemical blowing agent, and a metal stearate as a foam stabilizer, whipping the mixture to form a foamy mass, and then heat-curing said foamy mass to a cellular hardened condition.

6. The method of making a rigid cellular resin material which comprises forming a mixture of a copolymerizable mix of a polyethylene glycol maleate and styrene, a polymerization catalyst, sodium bicarbonate as a blowing agent, and zinc stearate as a foam stabilizer, whipping the mixture to form a foamy mass, adding phenyl hydrazine and acetic acid to said foamy mass, and then heat-curing said foamy mass to a cellular hardened condition.

LOUIS E. NYE.

REFERENCES CITED

The following references are of record in the file of this patent:

FOREIGN PATENTS

| Number | Country | Date |
|---|---|---|
| 331,227 | Great Britain | June 24, 1930 |